United States Patent
Wang et al.

(10) Patent No.: US 8,660,191 B2
(45) Date of Patent: Feb. 25, 2014

(54) SOFTWARE VIDEO DECODER DISPLAY BUFFER UNDERFLOW PREDICTION AND RECOVERY

(76) Inventors: Jason N. Wang, San Jose, CA (US);
Michael Kutner, Mountain View, CA (US)

(\*) Notice: Subject to any disclaimer, the term of this patent is extended or adjusted under 35 U.S.C. 154(b) by 686 days.

(21) Appl. No.: 12/909,801

(22) Filed: Oct. 21, 2010

(65) Prior Publication Data
US 2011/0096833 A1    Apr. 28, 2011

Related U.S. Application Data

(60) Provisional application No. 61/254,136, filed on Oct. 22, 2009.

(51) Int. Cl.
*H04N 7/12* (2006.01)

(52) U.S. Cl.
USPC .................................................... 375/240.25

(58) Field of Classification Search
USPC ................... 375/240, 240.01, 240.12, 240.25
See application file for complete search history.

(56) References Cited

U.S. PATENT DOCUMENTS

| | | | |
|---|---|---|---|
| 5,768,481 A | 6/1998 | Chan et al. | |
| 5,805,735 A | 9/1998 | Chen et al. | |
| 6,115,496 A | 9/2000 | Nguyen et al. | |
| 7,554,468 B2 | 6/2009 | Xu | |
| 7,948,408 B2 | 5/2011 | Xu | |
| 8,238,442 B2 | 8/2012 | Liu | |
| 2002/0143792 A1 | 10/2002 | Belu | |
| 2004/0005007 A1* | 1/2004 | Viscito et al. | 375/240.25 |
| 2008/0049844 A1 | 2/2008 | Liu et al. | |

OTHER PUBLICATIONS

"Draft of Version 4 of H.264/AVC (ITU-T Recommendation H.264 and ISO/IEC 14496-10 (MPEG-4 pat 10) Advanced Video Coding)" by Gary Sullivan, Thomas Wiegand and Ajay Luthra—Joint Video Team (JVT) of ISO/IEC MPEG & ITU-T VCEG (ISO/IEC JTC1/SC29/WG11 and ITU-T SG16 Q.6)—14th Meeting: Hong Kong, CH Jan. 18-21, 2005, 331 pages.
Sony Computer Entertainment Incorporated, "Cell Broadband Engine Architecture", Version 1.0, Aug. 8, 2005.
U.S.Provisional Application No. 61/254,136 titled "Software Video Decoder Display Buffer Underflow Prediction and Recovery," filed Oct. 22, 2009.

\* cited by examiner

*Primary Examiner* — Allen Wong
(74) *Attorney, Agent, or Firm* — Joshua D. Isenberg; JDI Patent

(57) ABSTRACT

Prediction of and recovery from display buffer underflow are described. A first time delay for displaying a first group of one or more frames of a video picture stream located in an output frame buffer is calculated. A second time delay for displaying a second group of one or more frames in the picture stream is calculated. The second group directly follows the first group in the output buffer and is currently decoded by a decoder, but not yet deposited into the output frame buffer. A third time delay for decoding a third group of one or more frames in the picture stream is calculated. The third group directly follows the second group and is not yet decoded by the decoder. The decoder switches to or remains in a fast decoding mode if the sum of the first and second time delays is less than the third time delay.

15 Claims, 6 Drawing Sheets

SOFTWARE VIDEO DECODER DISPLAY BUFFER UNDERFLOW PREDICTION AND RECOVERY

BACKGROUND OF INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video picture frame by eliminating the spatial and temporal redundancies in the picture and among successive pictures. Through the use of such compression standards, video contents can be carried in highly compressed video bit streams, and thus efficiently stored in disks or transmitted over networks.

Before a video stream is displayed to a user, it must be decoded. Typically, a video decoder is expected to output decoded frames to an output frame buffer before the frame is needed for display. However, with a software decoder, the decoding delay of each frame is unpredictable and this may lead to a phenomenon known as display buffer underflow.

When a media player begins the process of displaying a video stream to a user, the video decoder fills up the output frame buffer with decoded frames of the video stream. Once the output buffer is full, the media player begins to display the decoded frames in the output buffer. At a certain point, the decoder may begin running at a slower rate than the display due to the unpredictability of the decoding delay. The number of decoded frames in the output frame buffer begins to decrease as the media player begins to display decoded frames at a faster rate than the video decoder can decode video frames. This is known as display buffer underflow. If the video decoder remains running at a slower rate than the display rate of the media player, the media player will eventually run out of decoded frames in the output frame buffer to display. As a result, the user will notice that the video stream becomes frozen.

Currently many software video decoders are capable of handling display buffer underflow. However, these display buffer underflow handling mechanisms do not take place until underflow is actually recognized by the video decoder.

Compensation of the underflow of decoded frames in the output frame buffer usually involves increasing the rate at which the incoming video stream frames are decoded, but compensation at this point of detection usually leads to video quality degradation.

It is within this context that embodiments of the present invention arise.

DESCRIPTION OF THE DRAWINGS

Figure 1:
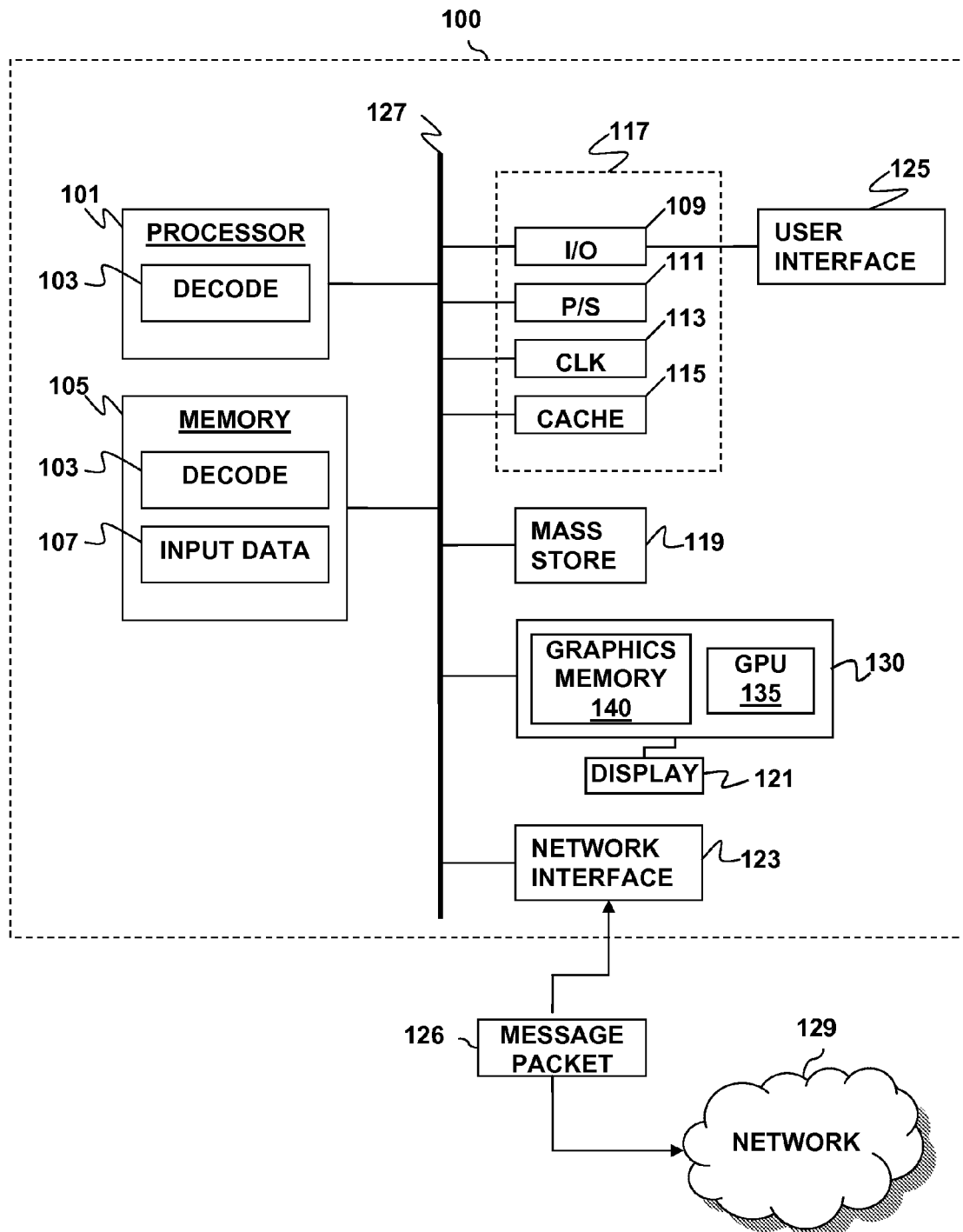
FIG. 1 is a block diagram illustrating an apparatus for implementing display buffer underflow prediction and recovery according to an embodiment of the present invention.

FIG. 1 illustrates a diagram of a computer system 100 that may be used to implement display buffer underflow prediction and recovery as described below. By way of example, and without loss of generality, the system 100 may be implemented as a personal computer, video game console, digital video recorder, portable game device, cellular telephone, portable internet device, personal digital assistant, or other digital device, suitable for practicing embodiments of the invention. The system 100 may include a processor module 101 and a memory 105. The processor module 101 may include one or more processor cores. The CPU 101 may be configured to run software applications and, optionally, an operating system. One possible example, among others, of a processing system that uses multiple processor modules, is a Cell Processor, examples of which are described in detail, e.g., in *Cell Broadband Engine Architecture*, which is available online at http://www-306.ibm.com/chips/techlib/techlib.nsf/techdocs/1AEEE1270EA27 76387257060006E61BA/$file/CBEA_01_pub.pdf, which is incorporated herein by reference.

The memory 105 may be in the form of an integrated circuit, e.g., RAM, DRAM, ROM, and the like. The memory may also be a main memory that is accessible by all of the processor modules 101. In some embodiments, the processor module 101 may have local memories associated with each core. A decoder program 103 may be stored in the main memory 105 in the form of processor readable instructions that can be executed on the processor modules 101. The decoder program 103 may be configured to provide display buffer underflow prediction and recovery as described below in FIG. 4. The decoder program 103 may be written in any suitable processor language, e.g., C, C++, JAVA, Assembly, MATLAB, FORTRAN, and a number of other languages. Input data 107 may be stored in the memory 105. Such input data may include buffered portions of streaming data, e.g., encoded video pictures or portions thereof. During execution of the decoder program 103, portions of program code and/or data 107 may be loaded into the memory 105 or the local stores of processor cores for parallel processing by multiple processor cores. By way of example, and not by way of limitation, the input data 107 may include encoded video streams, or portions thereof, as well as decoded video streams and portions thereof. These various sections may be stored in one or more buffers. In particular, decoded and/or post processed sections may be stored in an output picture buffer implemented in the memory 105.

The decoder program 103 is configured, by suitable programming to implement an algorithm for predicting display buffer underflow and recovering from display buffer underflow when executed by the processor module 101. In general, the algorithm involves: a) calculating a time delay for displaying a first group of one or more frames of a video picture stream located in an output frame buffer; b) calculating a time delay for displaying a second group of one or more frames in the video picture stream, the second group of one or more frames directly following the first group of one or more frames in the output buffer and currently decoded by a decoder, but not yet deposited into the output frame buffer; c)

calculating a time delay for decoding a third group of one or more frames in the video picture stream, the third group of one or more frames directly following the second group and not yet decoded by the decoder; and d) switching the decoder to a fast decoding mode or having the decoder remain in a fast decoding mode if the sum of the time delay in a) and b) is less than the time delay in c). The fast decoding mode may be configured to begin during decoding of a first frame of the third group of one or more frames in the video picture stream.

The system 100 may also include well-known support functions 117, such as input/output (I/O) elements 109, power supplies (P/S) 111, a clock (CLK) 113, and a cache 115. The system may optionally include a mass storage device 119 such as a disk-drive, CD-ROM drive, tape drive, or the like to store programs and/or data. The system 100 may also include one or more user input devices 125 to facilitate interaction between the system 100 and a user. By way of example, one or more of the user input devices 125 may be coupled to the system 100 via the I/O elements 109. Examples of suitable user input devices 125 may include a keyboard, mouse, joystick, light pen or other device that may be used in conjunction with a graphical user interface (GUI). The system 100 may include a network interface 123 to facilitate communication via an electronic communications network 129. The network interface 123 may be configured to implement wired or wireless communication over local area networks and wide area networks such as the Internet. The system 100 may send and receive data and/or requests for files via one or more message packets 126 over the network 129.

The system 100 may further comprise a graphics subsystem 130, which may include a graphics processing unit (GPU) 135 and graphics memory 140. The graphics memory 140 may include a display memory (e.g., a frame buffer) used for storing pixel data for each pixel of an output image. The graphics memory 140 may be integrated in the same device as the GPU 135, connected as a separate device with GPU 135, and/or implemented within the memory 105. Pixel data may be provided to the graphics memory 140 directly from the CPU 101. Alternatively, the CPU 101 may provide the GPU 135 with data and/or instructions defining the desired output images, from which the GPU 135 may generate the pixel data of one or more output images. The data and/or instructions defining the desired output images may be stored in memory 105 and/or graphics memory 140. In an embodiment, the GPU 135 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 135 may further include one or more programmable execution units capable of executing shader programs.

The graphics subsystem 130 may periodically output pixel data for an image from the graphics memory 140 to be displayed on a video display device 121. The video display device 121 may be any device capable of displaying visual information in response to a signal from the system 100, including CRT, LCD, plasma, and OLED displays. The computer system 100 may provide the display device 121 with an analog or digital signal. By way of example, the display 121 may include a cathode ray tube (CRT) or flat panel screen that displays text, numerals, graphical symbols or images.

The components of the system 100, including the CPU 101, memory 105, support functions 117, mass storage device 119, user input devices 125, network interface 123, and graphics subsystem 130 may be operably connected to each other via one or more data buses 127. These components may be implemented in hardware, software, firmware, or some combination of two or more of these.

Figure 2:
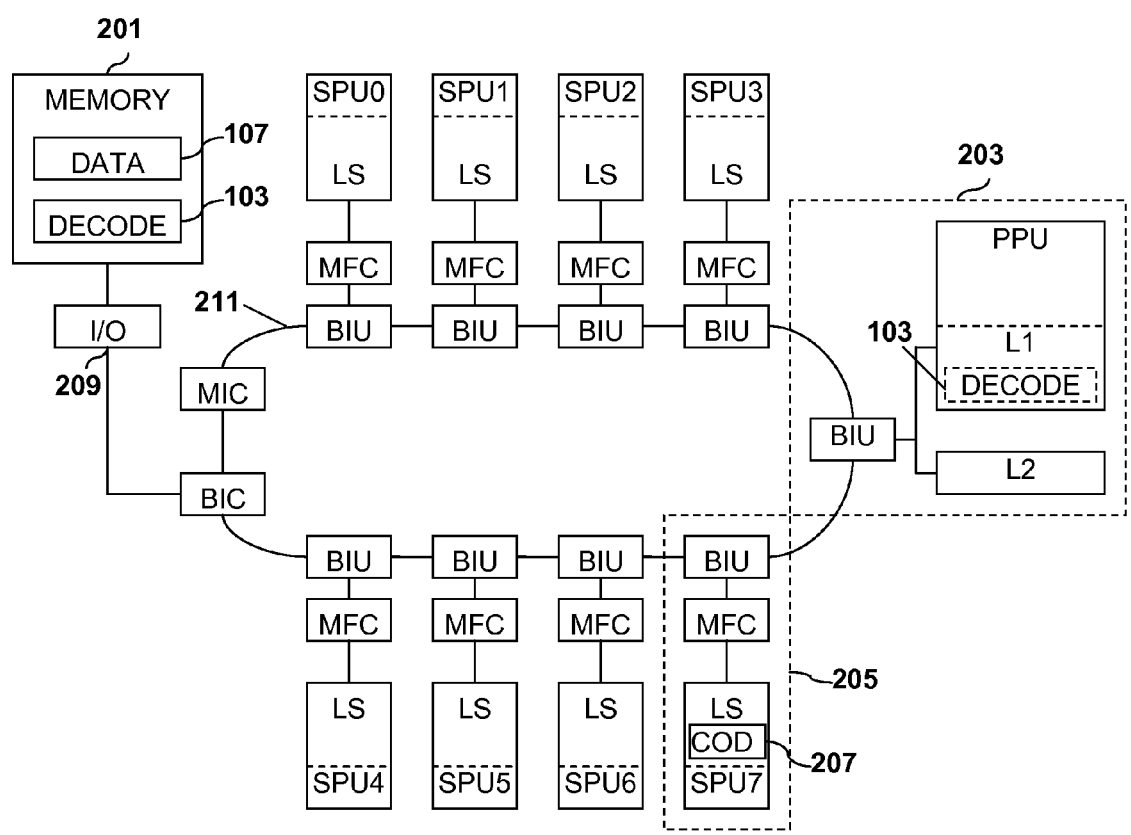
FIG. 2 is a block diagram illustrating an example of a cell processor implementation of an apparatus for implementing display buffer underflow prediction and recovery according to an embodiment of the present invention.

Some embodiments of the present invention may take advantage of a Cell processor architecture or similar processor architecture. FIG. 2 illustrates an example of a cell processor 200 configured to implement display buffer underflow prediction and recovery according to an embodiment of the present invention. The cell processor 200 includes a main memory 201, a single power processor element (PPE) 203, and eight synergistic processor elements (SPE) 205. By way of example, the PPE 203 may include a 64-bit PowerPC Processor Unit (PPU) with associated caches. Some implementations, e.g., CBEA-compliant systems may include a vector multimedia extension unit in the PPE 203. The PPE 203 may be a general purpose processing unit that can access system management resources (such as memory-protection tables). Hardware resources may be mapped explicitly to a real address space as seen by the PPE 203. Therefore, the PPE 203 may address any of these resources directly by using an appropriate effective address value. A primary function of the PPE 203 is the management and allocation of tasks for the different SPE 205. The PPU may execute coded instructions of a decoder program 103 configured to implement display buffer underflow prediction and recovery.

The SPE 205 are less complex computational units than the PPE 203, in that they need not perform any system management functions. Each SPE 205 includes a processor unit, sometimes referred to as a synergistic processor unit (SPU) and an associated local store (LS). The SPE 205 may generally have a single instruction, multiple data (SIMD) capability and typically process data and initiate any required data transfers (subject to access properties set up by the PPE 203) in order to perform their allocated tasks. An SPE 205 may store in its local store instructions 207 that implement portions of the decoder program 103. The purpose of the SPE is to enable applications that require a higher computational unit density and can effectively use the provided instruction set. Although 8 SPEs are shown in this example, the cell processor 200 may be configured with any number of SPEs. With respect to FIG. 2, the memory 201, PPE 203, and SPEs 205 can communicate with each other and with an I/O device 209 over a ring-type element interconnect bus 211. The memory 201 may be accessed by the PPE 203 and SPEs 205 via a memory interface controller (MIC).

The memory 201 may contain portions of a decoder program 103 having features in common with the decoder program 103 described herein. The memory 201 may also contain portions of data 107 that may be used during processing by the PPE 203 and SPEs 205. By way of example, and not by way of limitation, the input data 107 may include encoded video streams, or portions thereof, as well as decoded video streams and portions thereof. These various sections may be stored in one or more buffers. In particular, decoded and/or post processed sections may be stored in an output picture buffer implemented in the memory 201.

Figure 3:
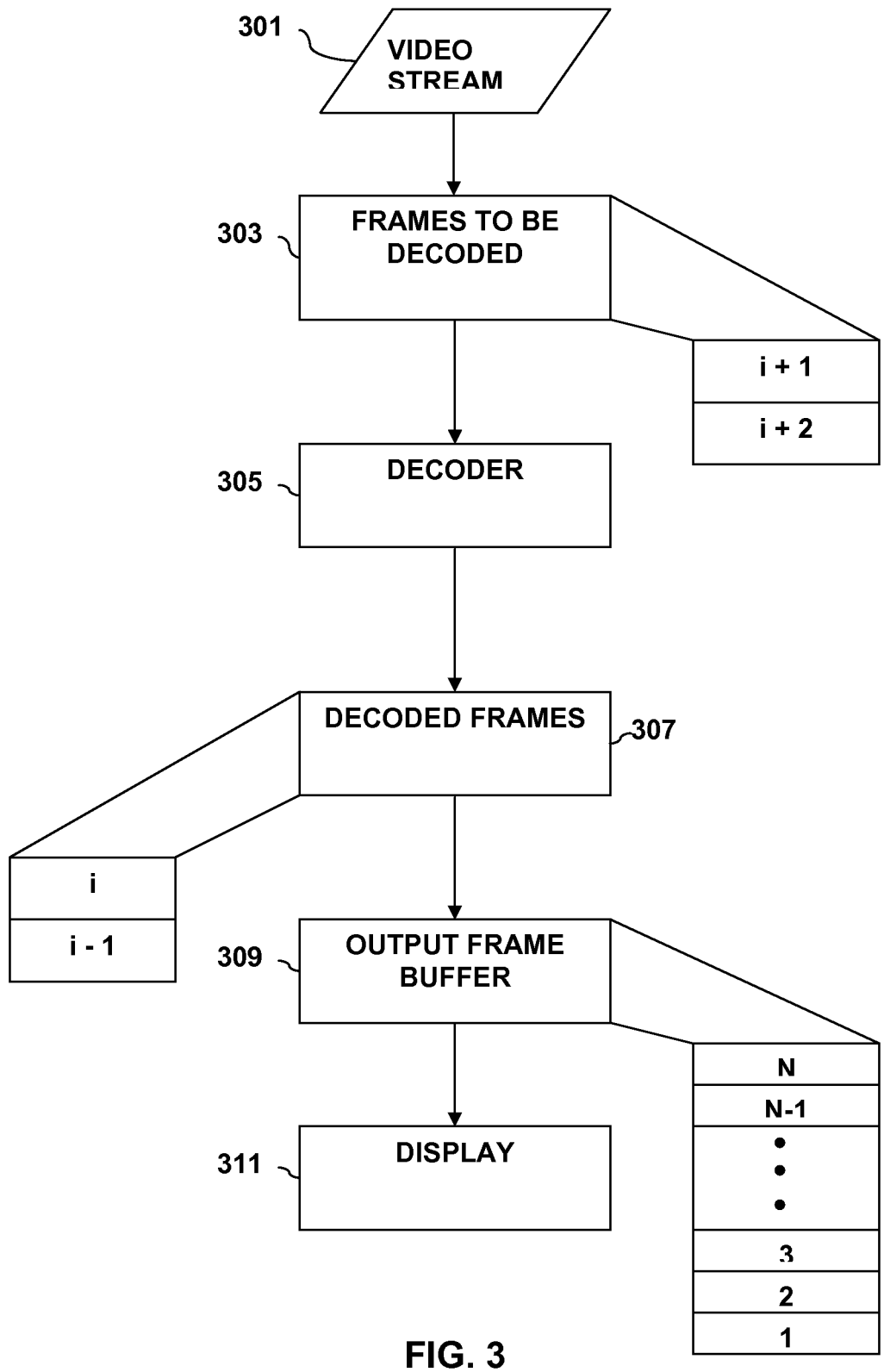
FIG. 3 is a block diagram illustrating the general process of displaying a video picture.

As noted above, the program 103 include instructions that, when executed, implement display buffer underflow prediction and recovery in accordance with embodiments of the present invention. To understand the display buffer underflow prediction and recovery method, it is useful to understand a general process of decoding and displaying a video picture stream that may also be implemented by the program 103. FIG. 3 is a block diagram illustrating a general process 300 of displaying a video picture. A given encoded video picture stream 301 is composed of individual encoded video frames 303, otherwise known as video pictures, that make up the video stream. These individual video frames may further consist of video field pictures, which represent a portion of a given video frame. Individual video frames are ordered and processed sequentially during the decoding and display process.

A given video picture frame must be first decoded by the decoder 305 as decoded frames 307 and then stored in the output frame buffer 309 before it is finally sent to the display 311. Display buffer underflow is a phenomenon that occurs when the rate at which video frames in the output frame buffer 309 are being sent to the display 311 is faster than the rate at which frames are being decoded by the decoder 305 and loaded into the output frame buffer 309. If the decoder 305 is running too slowly, then the output frame buffer 309 may run out of video frames to send to the display 311, which will lead to a frozen video at the user-end.

The decoder 305 contributes the majority of the delay associated with the decoding and display of a video stream 301 when it implements a standard version of decoding as described below. The decoder 305 may also be configured to implement a fast version of decoding to limit the delay associated with decoding, which is also described below. Because the delay associated with decoding a given video picture is difficult to predict, the output frame buffer 309 stores decoded frames until they are ready to be displayed in order to help diffuse the delay cause by the decoder 305. Since the output frame buffer 309 already has video frames ready to be sent to the display 311, the decoder 305 is given a time cushion to decode an incoming picture frame without having to worry about the video freezing for the user.

At any given time during the processing of an input video stream 301, the output frame buffer 309 may have multiple video frames waiting to be displayed (e.g., 1 . . . N). The output frame buffer 309 temporarily stores these decoded video frames until they are ready to be displayed. Likewise, there may also be a queue of decoded frames 307 that have yet to enter the output frame buffer 309 (e.g., i, i−1). By way of example, and not by way of limitation, these decoded frames 307 may be waiting for the output frame buffer 309 to free up space in order to store these decoded frames 307, or there may be a timing delay between the completion of decoding and the transfer to the output frame buffer 309 causing the decoded frames 307 to sit outside the output frame buffer 309. Lastly there may also be a queue of frames (e.g., i+1, i+2) waiting to be decoded 303 if the video stream 301 has not finished processing. The number of frames waiting to be decoded 303 may vary depending on the particular implementation of this invention. It is important to note that many variations on the number of frames sitting in the output frame buffer 309, the number of decoded frames 307 not yet stored in the output frame buffer 309, and the number of frames to be decoded 303 may be available.

According to certain embodiments of the invention, underflow prediction may be done using, e.g., two future video picture frames at a time. However, the invention may also encompass embodiments in which more than two future video picture frames can be used to predict whether display buffer underflow is imminent.

Currently, many software video decoders have display underflow handling capabilities, but these methods only deal with display buffer underflow at the time of its occurrence which leads to significant video quality degradation. These methods are not equipped to predict display buffer underflow to avoid the degradation of video quality.

Figure 4:
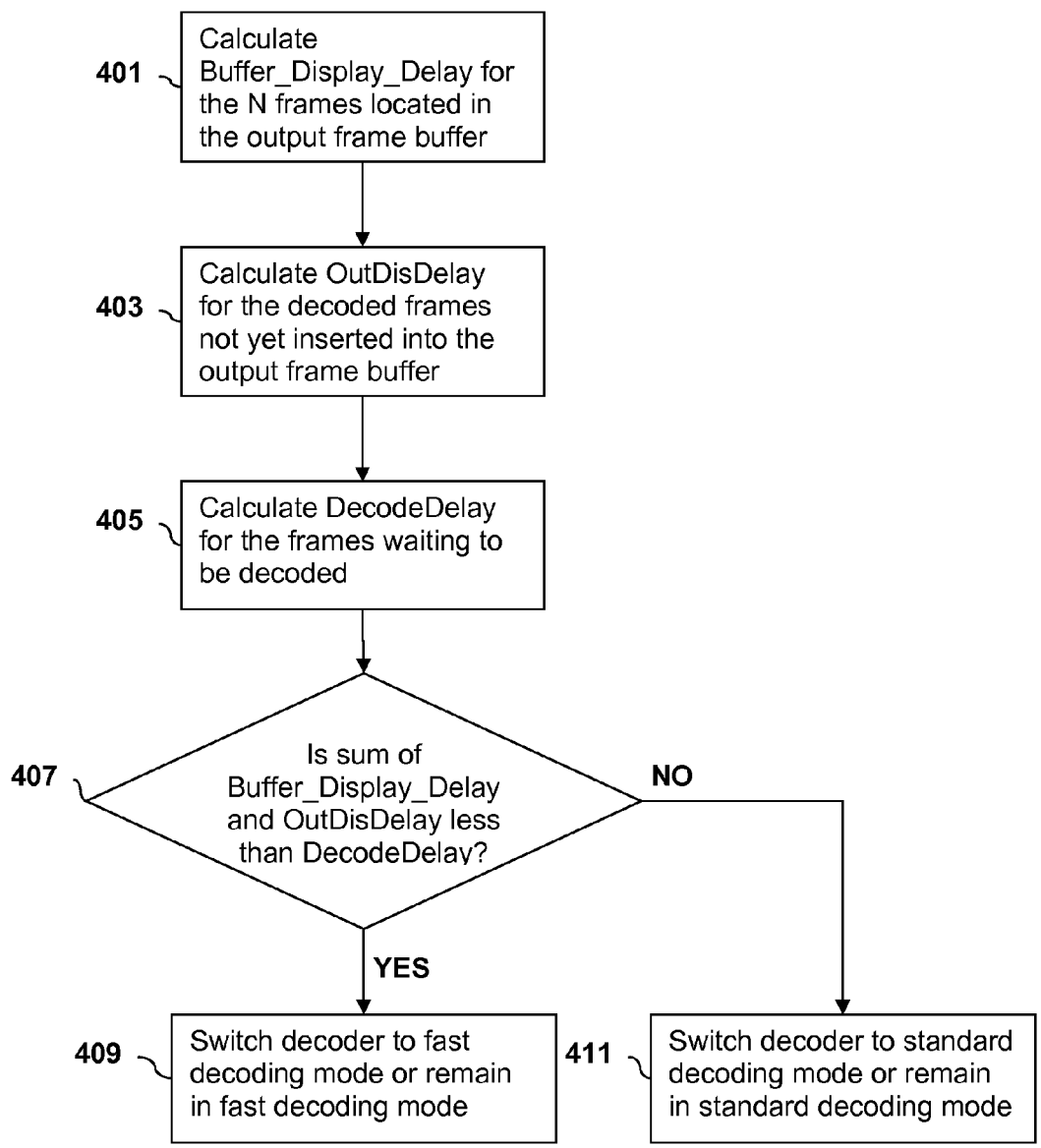
FIG. 4 is a flow diagram illustrating a method for display buffer underflow prediction and recovery.

FIG. 4 is a flow diagram illustrating a method 400 of display buffer underflow prediction and recovery according to an embodiment of the present invention. By way of example, and not by way of limitation, this method 400 may be implemented by executing certain instructions of the program 103 with the processor 101 of FIG. 1 or the PPU of FIG. 2. The decoder method depicted in FIG. 3 will be used as an example to illustrate the method 400 of display buffer underflow prediction and recovery, but it is important to note that other variations of video frame combinations associated with the output frame buffer 309 and decoder 305 may be used as well.

By way of example, the output frame buffer 309 may have N frames ready for display. The decoded frames 307 that have yet to enter the output frame buffer 309 may include frames: i and i−1. Furthermore, the frames 303 waiting to be decoded include frames i+1 and i+2.

Initially a calculation may be made to determine a total time delay for displaying the N frames in the output frame buffer 309. In this example, the total time delay is referred to as the Buffer_Display_Delay as indicated at 401. Each video frame to be displayed has a decode time stamp and display time stamp associated with it, and these time stamps may be used to determine the display delay for each individual video frame in the output frame buffer. The display delays of each individual frame (e.g., 1 . . . N) to be displayed may be summed to determine a Buffer_Display_Delay value. For the sake of example, the Buffer_Display_Delay may be measured in time units referred to as "ticks". As, used herein, a "tick" is defined as the duration of time required to display a field picture. At any given time the Buffer_Display_Delay parameter represents the total amount of time, in ticks, required to empty the output frame buffer 309 and display all the frames that have been emptied.

After the Buffer_Display_Delay has been determined, an output display delay (OutDisDelay) is calculated as described at 403. The OutDisDelay represents the total time, in ticks, required to display an individual decoded frame 307 that has yet to enter the output frame buffer 309. This includes the time required for the decoded frame 307 to reach the output frame buffer 309 as well as the time required for this frame to leave the output frame buffer 309 for display. In the present example, the OutDisDelay is determined for each decoded frame 307 that has yet to be inserted into the output frame buffer 309, which includes frames i and i−1. The OutDisDelay value may be determined from the display time stamp and decode time stamp associated with each of these decoded frames 307.

Once the OutDisDelay value has been determined for each decoded frame 307 that has not yet entered the output frame buffer 309, a decoding delay (DecodeDelay) may be determined for each frame ready to be decoded 303 as indicated at 405. The DecodeDelay represents a total time, in ticks, required to decode an encoded video frame that is sitting in the queue waiting to be decoded. It is important to note that the DecodeDelay may be determined using standard decoding mode performance characteristics regardless of whether the decoder 305 is currently operating in a fast decoding mode or a standard decoding mode. In order to effectively use this method of display buffer underflow and recovery, the DecodeDelay may be determined for at least two future video frames. In the present example, the future video frames include frame i+1 and i+2. Because these future video frames have yet to begin decoding (e.g., do not have a decode time stamp), the DecodeDelay value may be predicted. A maximum frame decode delay, otherwise known as MaxFrameDecDelay, may serve as the DecodeDelay value for each of these two future frames.

This represents a worst case scenario, and may be used to err on the side of caution when predicting when display buffer underflow is about to occur. Alternatively, a decoding delay value with a highest likelihood of occurrence may be used as the DecodeDelay value for each of these two future frames. This value may allow for accurate prediction of display buffer underflow in a majority of cases, but may create inaccuracies when the actual DecodeDelay is longer than the predicted DecodeDelay.

After the Buffer_Display_Delay, OutDisDelay, and DecodeDelay have been determined for their respective video frames, the values are compared. The sum of the Buffer_Display_Delay and OutDisDelay values for all decoded frames 307 not yet inserted into the output frame buffer 309 is compared to the sum of DecodeDelay values for all frames waiting to be decoded 303 as described at 407.

If the sum of the Buffer_Display_Delay and the OutDisDelay values for all decoded frames 307 not yet inserted into the output frame buffer 309 is less than the sum of DecodeDelay values for all frames waiting to be decoded 303, then display buffer underflow may be detected or predicted and the decoder 305 may switch from a standard decoding mode to a fast decoding mode as indicated at 409. If the decoder 305 is already in fast decoding mode, it may remain in fast decoding mode as indicated at 409. The fast decoding mode increases the rate at which video frames are decoded and fed to the output frame buffer such that the display buffer underflow may be corrected.

If, however, the sum of the Buffer_Display_Delay and the OutDisDelay values for all decoded frames 307 not yet inserted into the output frame buffer 309 is greater than the sum DecodeDelay values for all frames waiting to be decoded 303, then display buffer underflow is not detected and the decoder 305 will remain in the standard decoding mode as described at 411. If the decoder 305 is currently operating in fast decoding mode, then it will switch back to the standard decoding mode as described at 411. The standard decoding mode operates at a slower rate than the fast decoding mode, but offers higher output video frame quality. However, because the fast decoding mode will only be used periodically and for a short duration of time during each period, the video quality degradation will be barely visible to a user.

Figure 5A:
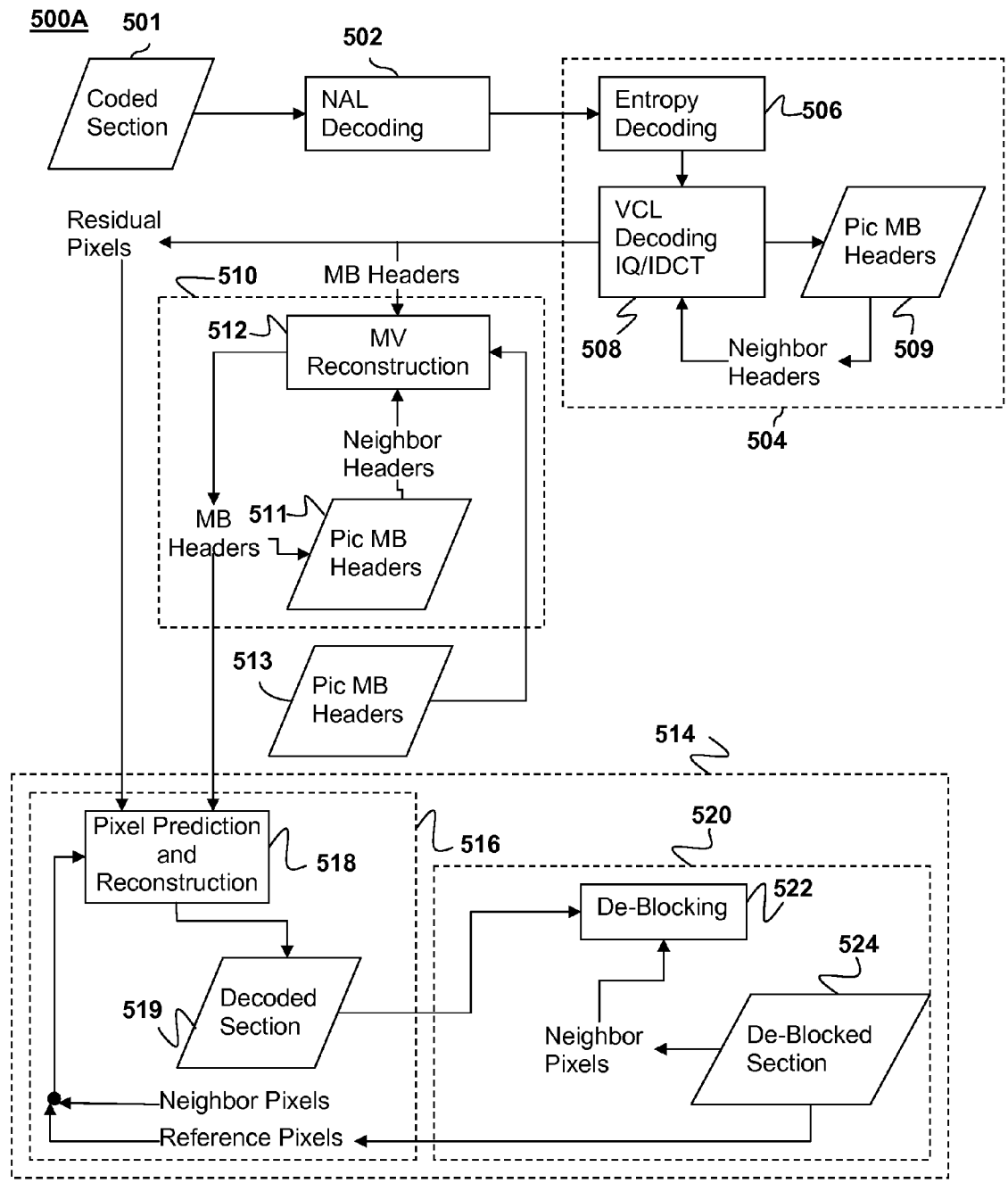
FIG. 5A illustrates an example of a possible process flow in a method for standard decoding of streaming data according to an embodiment of the present invention.

FIG. 5A illustrates an example of a possible process flow in a method 500A for standard decoding of streaming data 501. In embodiments of the present invention, streaming data may be broken down into suitable sizes for decoding. Video streams may be delivered to the user video picture by video picture as described above, but individual video pictures may also be further broken down into smaller partitions for decoding. These smaller partitions may allow for a given video picture, multiple video pictures, or multiple video picture partitions to be processed in parallel. By way of example, a single video picture may be broken down into one or more sections. As used herein, the term "section" refers to a group of one or more pixels within a picture. A section can range from a single pixel within the picture, up to the whole picture. Non-limiting examples include slices, macroblocks (MBs), sub-macroblocks, blocks, and individual pixels. A slice generally contains one or more rows of MBs. The number of MBs in a row depends on the size of the MBs and the size and resolution of the picture. For example, if each MB contains sixteen by sixteen pixels then the number of MBs in each row may be determined by dividing the width of the picture (in pixels) by sixteen. Each MB may be broken down into a number of sub-macroblocks. Each sub-macroblock may be broken down into a number of blocks and each block may contain a number of pixels. By way of example, and not by way of limitation, in a common video decoding scheme, each MB may be broken down into four sub-macroblocks. Each sub-macroblock may be broken down into four blocks, and each block may contain a 4×4 arrangement of sixteen pixels.

It is within this context that a method 500A for standard decoding of a video stream is described. Such a method may be implemented, in whole or in part, through execution of the instructions of the program 103 by a suitable processor. The coded streaming data 501 may initially be stored in a buffer. When the coded streaming data 501 (e.g., coded section of a video picture in the video stream) has been transferred over a network, e.g., the Internet, the data 501 may initially undergo a process referred to as network abstraction layer (NAL) decoding, indicated at 502. NAL decoding may remove from the data 501 information added to assist in transmitting the data. Such information, referred to as a "network wrapper" may identify the data as video data or indicate a beginning or end of a video stream, or include metadata about the video stream. In addition, by way of example, the network wrapper may include information about the data 501 including, e.g., resolution, picture display format, color transform palette transform matrix for displaying the data, information on the number of bits in each picture, slice, or macroblock, as well as information used in lower level decoding, e.g., data indicating the beginning or end of a slice. This information may be used to determine the number of MBs to pass to each of the task groups in a single section.

Due to its complexity, NAL decoding is typically done on a picture and slice level. The smallest NAL buffer used for NAL decoding is usually (though not invariably) slice sized. Fortunately, the NAL decoding process 502 involves a relatively low number of cycles. Consequently, the NAL decoding process 502 may be done on a single processor.

In some embodiments, after NAL decoding at 502, the remaining decoding in FIG. 5A may be implemented in three different task groups referred to herein as video coded layer (VCL) decoding 504, motion vector (MV) reconstruction 510, and picture reconstruction 514. The picture reconstruction task group 514 may include pixel prediction and reconstruction 516 and post processing 520. In some embodiments of the present invention, these task groups may be chosen based on data dependencies such that each task group may complete its processing of all MBs in a picture or section before the MBs are sent to the next task group for subsequent processing.

Certain codecs (e.g., coder/decoder systems) may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (ICDT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data, a process known as inverse quantization (IQ) is used before performing the inverse transform from the frequency domain to the spatial domain. The data dependencies for the VCL IQ/IDCT decoding process 504 are typically at the MB level for MBs within the same slice. Consequently, results produced by the VCL decoding process 504 may be buffered at the MB level.

VCL decoding 504 often includes a process referred to as Entropy Decoding 506, which is used to decode the VCL syntax. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability of the symbol. By way of example, and not by way of limitation, the codec known as AVC (H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC (H.264) video streams. Decoding the entropy layer of AVC (H.264)-coded video streams can be computationally intensive and may present challenges for devices that decode AVC (H.264)-coded video streams using general purpose microprocessors. To decode high bit-rate streams such as those targeted by the Blu-ray or other HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in co-pending U.S. Pat. No. 7,554,468 to Xun Xu, entitled "ENTROPY DECODING METHODS AND APPARATUS", which is incorporated herein by reference.

In addition to entropy decoding 506, the VCL decoding process may involve inverse quantization (IQ) and/or inverse discrete cosine transformation (IDCT) as indicated at 508. These processes may decode the headers 509 and data from MBs. The decoded headers 509 may be used to assist in VCL decoding of neighboring MBs.

VCL decoding 504 may be implemented at a macroblock level data dependency frequency. Specifically, different macroblocks within the same slice may undergo VCL decoding in parallel and the results may be sent to the motion vector reconstruction task group 510 for further processing.

Subsequently, all MBs in the picture or section being decoded may undergo motion vector reconstruction 510. The MV reconstruction process 510 may involve motion vector reconstruction 512 using headers from a given MB 511 and/or co-located MB headers 513. An MV describes apparent motion within a picture. Such MVs allow reconstruction of a picture (or portion thereof) based on knowledge of the pixels of a prior picture and the relative motion of those pixels from picture to picture. Once the MV has been recovered, pixels may be reconstructed at 516 using a process based on residual pixels from the VCL decoding process 504 and motion vectors from the MV reconstruction process 510. The data dependency frequency (and level of parallelism) for the MV depends on whether the MV reconstruction process 510 may be implemented in parallel at the slice level or picture level. For MV reconstruction involving co-located MB headers, the data dependency frequency is at the picture level and the MV reconstruction process 510 may be implemented with parallelism at the slice level.

The results of motion vector reconstruction 510 are sent to the picture reconstruction task group 514, which may be parallelized on a picture frequency level. Within the picture reconstruction task group 514 all macroblocks in the picture or section may undergo pixel prediction and reconstruction 516 in conjunction with de-blocking 520. The pixel prediction and reconstruction task 516 and the de-blocking task 520 may be parallelized to enhance the efficiency of decoding. These tasks may be parallelized within the picture reconstruction task group 514 at a macroblock level based on data dependencies. For example, pixel prediction and reconstruction 516 may be performed on one MB followed by de-blocking 520. Reference pixels from the decoded picture obtained by de-blocking 520 may be used in pixel prediction and reconstruction 516 on subsequent macroblocks. Pixel prediction and reconstruction 518 produces decoded sections 519 (e.g., decoded blocks or MBs) that include neighbor pixels which may be used as inputs to the pixel prediction and reconstruction process 518 for a subsequent MB. The data dependencies for pixel prediction and reconstruction 516 allow for a certain degree of parallel processing at the MB level for MBs in the same slice.

In some embodiments of the present invention, pixel prediction may use pixels within the current picture that is being decoded as reference pixels instead of pixels from an already decoded picture.

The post processing task group 520 may include a de-blocking filter 522 that is applied to blocks in the decoded section to improve visual quality and prediction performance by smoothing the sharp edges which can form between blocks when block coding techniques are used. The de-blocking filter 522 may be used to improve the appearance of the resulting de-blocked sections 524. The decoded section 519 or de-blocked sections 524 may provide neighboring pixels for use in de-blocking a neighboring MB. In addition, decoded sections 519 including sections from a currently decoding picture may provide reference pixels for pixel prediction and reconstruction 518 for subsequent MBs. It is during this stage that pixels from within the current picture may be used for pixel prediction within that same current picture independent of whether the picture is inter-coded or intra-coded. De-blocking 520 may be parallelized on a MB level for MBs in the same picture.

After all sections of a given video picture have undergone post processing 520, the sections may be recombined to form a video picture, which is sent to an output buffer until it is ready to be displayed. This method 500A of standard decoding may be subject to display buffer underflow, due to its slower rate of operation. Because the standard mode of decoding creates more accurate video pictures with higher video quality, some of the speed associated with the decoding process is sacrificed. To allow the decoder to recover from buffer display underflow and/or to prevent the decoder from reaching a level of buffer display underflow a faster mode of decoding, may be used in selected situations as described below.

Figure 5B:
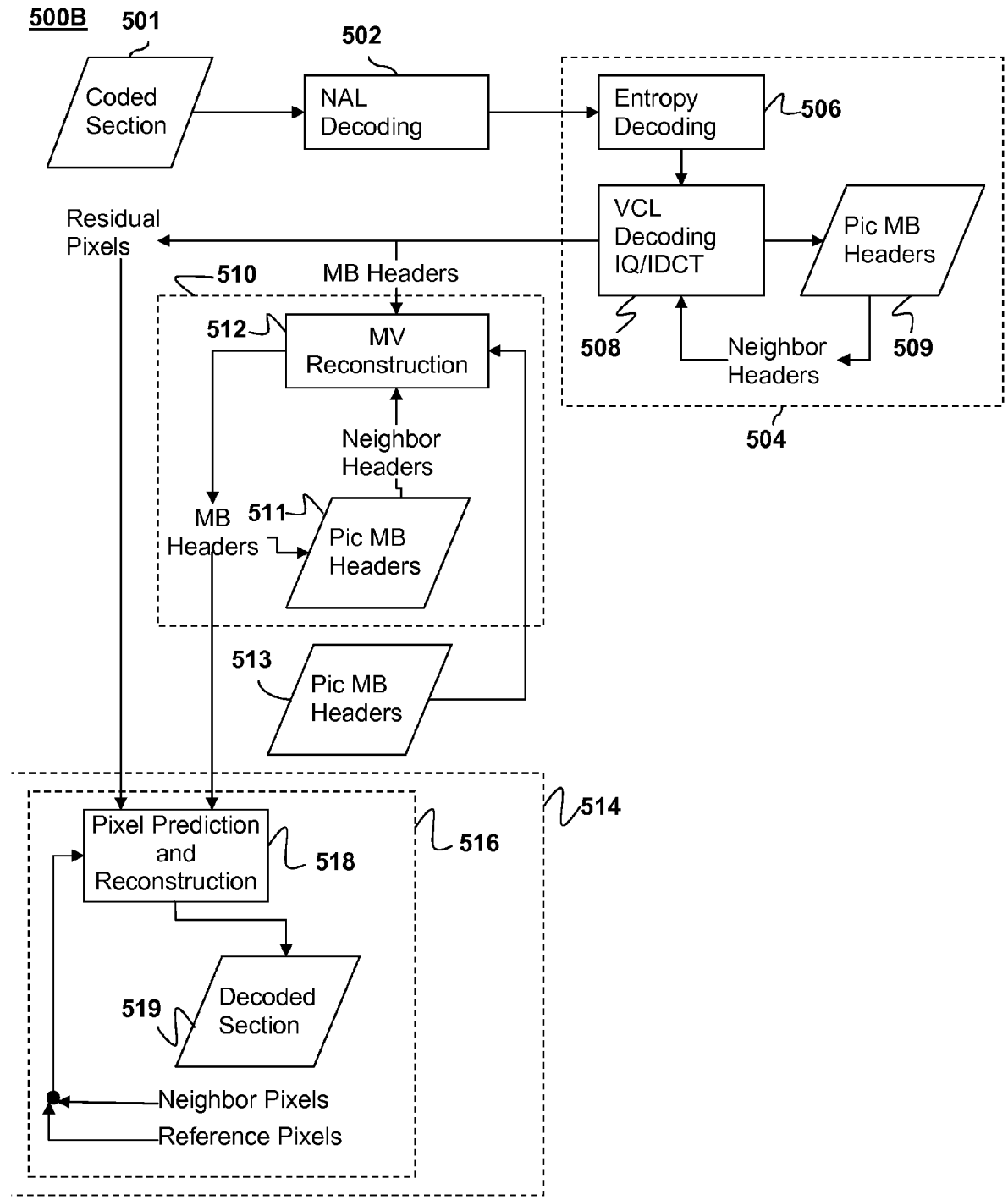
FIG. 5B illustrates an example of a possible process flow in a method for fast decoding of streaming data according to an embodiment of the present invention.

FIG. 5B illustrates an example of a possible process flow in a method 500B for fast decoding of streaming data 501. The method 500B of fast decoding works similarly to the standard method 500A of decoding, but omits the post processing task group. By omitting the post processing task group, the image quality for each individual video picture may diminish due to the sharp edges that form between neighboring blocks, as well as the loss of more accurate reference pixels to be used during pixel prediction and reconstruction. However, the advantage gained by the omission of the post processing task group is a much faster rate of decoding. The increased rate of decoding allows the decoder to finish decoding video pictures of a video stream more quickly, thereby allowing the output buffer to remain filled and recover from buffer display underflow. Although the decoded video pictures associated with the method 500B of fast decoding may suffer in quality, the decoder never remains in the fast decoding mode for a significant period of time (e.g., only until buffer underflow is no longer predicted), and so the visible quality degradation is barely visible to the user.

By way of example, and not by way of limitation, the fast decoding mode may be a standard decoding mode that omits de-blocking.

By way of numerical example, and not by way of limitation, assume the following:

OutDisDelay[i+1]]=OutDisDelay[i+2]=2*Tick
DecodeDelay[i+1]=DecodeDelay[i+2]=MaxFrameDecDelay For each input picture i, the decoder program 103 may send out following information, e.g., by way of a callback function:

1. The identification of estimation used pictures, i−1, i, i+1 and i+2
2. OutDisDelay[i−1], OutDisDelay[i], OutDisDelay[i+1] and OutDisDelay[i+2]
3. DecodeD[i−1], DecodeD[i], DecodeD[i+1] and DecodeD[i+2]

Assume there are N frames in the output frame buffer. The IDs of these frames are from $n_0$ to $n_N$. The delay to finish display of these N frames may be computed as, $$\text{Buffer\_Display\_Delay} = \sum_{j=n0}^{nN} DisplayDelay[j] \quad [1]$$

Assume the player already starts video display and the core decoder estimated the delay for pictures $i_0$ to $i_n$, if, for a given picture ID i, $$\text{Buffer\_Display\_Delay} + \sum_{j=i0}^{i-1} OutDisDelay[j] < \sum_{j=i0}^{i} DecodeDelay[j] \quad [2]$$

The decoder program 103 may assume that underflow will happen before picture i decoding is finished. So, the decoder program 103 calls a fast decode function with passing the parameter i.

If the core of the decoder program 103 receives a fast decode command with parameter i, the core may check if any pending decoding pictures are before or after picture i. For any pending decoding pictures with ID bigger or equal to i, the core decoder may mark these pictures as error and output these pictures even before the actual decoding process is done. Then, starting from the next input picture, the decoder may use the fast decoding mode as described above. If there are no pending decoding pictures after given picture i, the code decoder starts fast mode when and after it decodes picture i. It is noted that even when the decoder starts using fast mode, for each picture, the estimated decoding delay may still be based on the normal decoding performance.

After a few pictures, if the decoder program 103 can no longer detect or predict any possible output frame buffer underflow by using equation [2], the decoder program may switch back to normal decoding, e.g., by calling a normal decode function.

A number of variations on the above described embodiments are possible. For example, the underflow prediction algorithm may be executed by a control module, which may be implemented in hardware or software independently of the core video decoder program. As an alternative, the underflow prediction algorithm may be executed by the core video decoder. If the core video decoder implements the underflow prediction, the display buffer preferably pass the Buffer_Display_Delay to the core video decoder.

Furthermore, it is possible to use the most likely decoding delay for unknown pictures instead of using the worst case decoding delay, MaxFrameDecDelay. As the result, the frequency to call emergency fast decoding function may be much lower, although display buffer underflow might not be completely avoided.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶ 6. In particular, the use of "step of" in the claims herein is not intended to invoke the provisions of 35 USC §112, ¶ 6.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for predicting display buffer underflow and recovering from display buffer underflow, comprising:
    a) calculating a time delay for displaying a first group of one or more frames of a video picture stream located in an output frame buffer;
    b) calculating a time delay for displaying a second group of one or more frames in the video picture stream, the second group of one or more frames directly following the first group of one or more frames in the output buffer and currently decoded by a decoder, but not yet deposited into the output frame buffer;
    c) calculating a time delay for decoding a third group of one or more frames in the video picture stream, the third group of one or more frames directly following the second group and not yet decoded by the decoder; and
    d) switching the decoder to a fast decoding mode or having the decoder remain in a fast decoding mode if the sum of the time delay in a) and b) is less than the time delay in c), the fast decoding mode configured to begin during decoding of a first frame of the third group of one or more frames in the video picture stream.

2. The method of claim 1, further comprising switching the decoder back to a normal decoding mode from the fast decoding mode or having the decoder remain in a normal decoding mode if the sum of the time delay in a) and b) is less than the time delay in c).

3. The method of claim 1, wherein the fast decoding mode does not include a post-processing task group.

4. The method of claim 1, wherein the time delay in c) is determined by using a maximum frame decoding delay time for the third group of one or more frames.

5. The method of claim 1, wherein the time delay in c) is determined by using a most likely decoding delay time for the third group of one or more frames.

6. A system, comprising:
a processor unit;
a memory coupled to the processor unit;
a set of processor executable instructions embodied in the memory, the instructions being configured, when executed, to implement a method for predicting and recovering from display buffer underflow, the method comprising:
a) calculating a time delay for displaying a first group of one or more frames of a video picture stream located in an output frame buffer;
b) calculating a time delay for displaying a second group of one or more frames in the video picture stream, the second group of one or more frames directly following the first group of one or more frames in the output buffer and currently decoded by a decoder, but not yet deposited into the output frame buffer;
c) calculating a time delay for decoding a third group of one or more frames in the video picture stream, the third group of one or more frames directly following the second group and not yet decoded by the decoder; and
d) switching the decoder to a fast decoding mode or having the decoder remain in a fast decoding mode if the sum of the time delay in a) and b) is less than the time delay in c), the fast decoding mode configured to begin during decoding of a first frame of the third group of one or more frames in the video picture stream.

7. The system of claim 6, further comprising switching the decoder back to a normal decoding mode from the fast decoding mode or having the decoder remain in a normal decoding mode if the sum of the time delay in a) and b) is less than the time delay in c).

8. The system of claim 6, wherein the fast decoding mode does not include a post-processing task group.

9. The system of claim 6, wherein the time delay in c) is determined by using a maximum frame decoding delay time for the third group of one or more frames.

10. The system of claim 6, wherein the time delay in c) is determined by using a most likely decoding delay time for the third group of one or more frames.

11. A computer program product comprising:
non-transitory computer-readable medium having computer readable program code embodied in said medium for predicting display buffer underflow and recovering from display buffer underflow, said computer program product having:
a) computer readable program code means for calculating a time delay for displaying a first group of one or more frames of a video picture stream located in an output frame buffer;
b) computer readable program code means for calculating a time delay for displaying a second group of one or more frames in the video picture stream, the second group of one or more frames directly following the first group of one or more frames in the output buffer and currently decoded by a decoder, but not yet deposited into the output frame buffer;
c) computer readable program code means for calculating a time delay for decoding a third group of one or more frames in the video picture stream, the third group of one or more frames directly following the second group and not yet decoded by the decoder; and
d) computer readable program code means for switching the decoder to a fast decoding mode or having the decoder remain in a fast decoding mode if the sum of the time delay in a) and b) is less than the time delay in c), the fast decoding mode configured to begin during decoding of a first frame of the third group of one or more frames in the video picture stream.

12. The computer program product of claim 11, further comprising computer readable program code for switching the decoder back to a normal decoding mode from the fast decoding mode or having the decoder remain in a normal decoding mode if the sum of the time delay in a) and b) is less than the time delay in c).

13. The computer program product of claim 11, wherein the fast decoding mode does not include a post-processing task group.

14. The computer program product of claim 11, wherein the time delay in c) is determined by using a maximum frame decoding delay time for the third group of one or more frames.

15. The computer program product of claim 11, wherein the time delay in c) is determined by using a most likely decoding delay time for the third group of one or more frames.

* * * * *